T. R. BRENT.
Corn-Planter.
No. 36,069.
Patented Aug, 5, 1862.
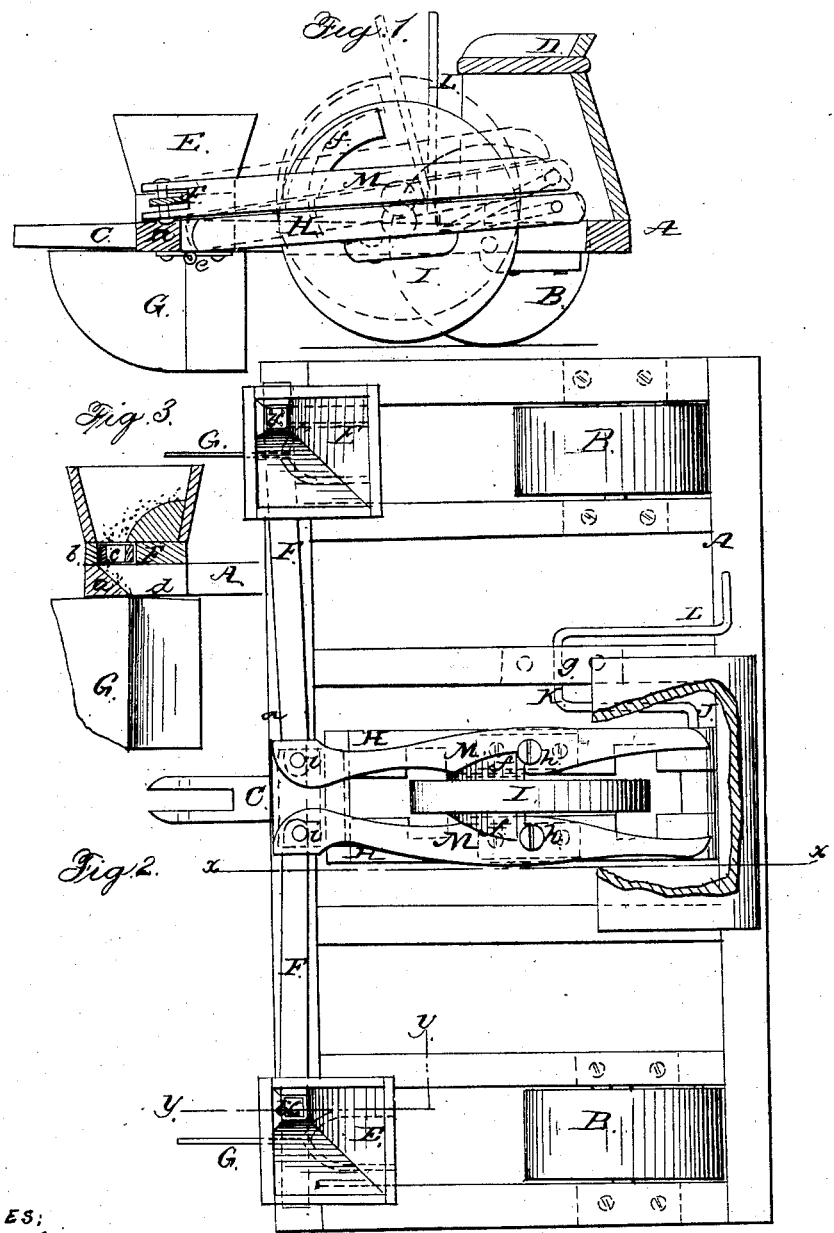

UNITED STATES PATENT OFFICE.

THEODORE R. BRENT, OF MUSCATINE, IOWA.

IMPROVEMENT IN CORN-PLANTERS.

Specification forming part of Letters Patent No. 36,069, dated August 5, 1862.

*To all whom it may concern:*

Be it known that I, THEODORE R. BRENT, of Muscatine, in the county of Muscatine and State of Iowa, have invented a new and Improved Corn-Planter; and I do hereby declare that the following is a full, clear, and exact description of the same, reference being had to the accompanying drawings, making a part of this specification, in which—

Figure 1 is a side sectional view of my invention, taken in the line $xx$, Fig. 2. Fig. 2 is a plan or top view of the same. Fig. 3 is a section of the same, taken in the line $yy$, Fig. 2.

Similar letters of reference indicate corresponding parts in the several figures.

This invention relates to an improved corn-planter of that class designed for planting corn in hills and in check-rows; and it consists in the employment or use of a cam-wheel placed in an adjustable frame and arranged with levers and slides in such a manner that the seed will be dropped automatically by the forward or draft movement of the machine, and the seed-dropping mechanism at the same time be under the complete control of the driver, so that it may be stopped or put in motion at any time, as circumstances may require.

To enable those skilled in the art to fully understand and construct my invention, I will proceed to describe it.

A represents a rectangular frame, which is mounted on two wheels, B B—one at each side—and having a draft-pole, C, attached.

D is the driver's seat, placed on the back part of the frame A, and E E are two seed-boxes, which are placed on the frame A at its front part—one at each side—as shown in Fig. 2.

F F represent two slide, which are placed on the front bar, $a$, of the frame A, and have their outer parts working underneath the seed-boxes E E, the bottoms of which are each provided with an opening, $b$. The outer part of each slide F also has an opening, $c$, made in it, and an opening, $d$, is made in the front bar, $a$, of the frame A near the seed-boxes E E, but out of line with the openings $b$ in the bottoms thereof, the openings $d$ being in line with the back parts of furrow-shares G, which are attached to the under side of the front bar $a$ of the frame A.

H is a frame, which is placed centrally within the frame A, and is attached at its front end by a hinge or joint, $e$, to the bar $a$ of the frame A. In the frame H there is fitted a wheel, I, which has a beveled projection, $f$, attached to each side of it near its periphery, said projections being at the same part of the wheel, as shown in Fig. 2. The back part of the frame H is fitted on a crank, J, the shaft K of which has its bearing $g$ on the frame A, and the shaft K has a lever, L, at one end, which lever extends up by the side of the driver's seat D.

M M are two levers, which are secured by fulcrum-pins $hh$ to the upper surface of the frame H, a lever being at each side of the wheel I. The front ends of these levers are connected by pivots $ii$ to the inner ends of the slides F F.

The operation is as follows: As the machine is drawn along, the wheel I in the frame H will be in contact with the earth and consequently rotated, the frame H in consequence of being connected at its front end by a hinge or joint, $e$, to the front bar, $a$, of frame A, allowing the wheel to adjust itself to the irregularities of the surface over which it may pass. As the wheel I rotates its projections $ff$ act against the levers M M at both sides of their fulcra. As the projections pass down in front of the fulcra of the levers, they force the front parts of the latter simultaneously from each other, and the slides F will be shoved outward so that their holes or openings $c$ will be in line with the holes or openings $b$ in the bottoms of the seed-boxes E, and the openings $c$ will consequently be filled with seed. As the projections $ff$ pass up back of the fulcra of the levers, the latter will be forced apart or outward from each other at their back ends, the front ends being at the same time drawn toward each other and the slides F also drawn inward, so that the holes $c$ will be brought in line with the holes or openings $d$ in the bar $a$ of the frame A, and the seed escapes from the holes $c$ through the holes $d$ into the furrows made by the shares G G. The wheels B B are designed to be sufficiently broad to serve as rollers to press the earth upon the seed.

The driver may at any time stop the seed-distributing mechanism by elevating the back part of the frame H through the medium of the crank J on the shaft K, the latter being turned by actuating the lever L. In raising the frame H the wheel I is elevated above the surface of the ground, and consequently will not rotate. By this arrangement the driver has complete control over the seed-dropping mechanism, and can by raising and lowering the frame H cause the seed to be planted in check-rows, as the dropping can be retarded or checked at any time, and the machine backed or adjusted to insure a proper dropping at the commencement of each row or "bout."

I do not claim the seed-slides F separately or in themselves considered, for they are an old and well-known device; but What I do claim as new, and desire to secure by Letters Patent, is—

The cam-wheel I, provided with projection $ff$, as shown, and placed in the adjustable frame H, which is connected at its front end by a hinge or joint, $e$, to the bar $a$ of the frame A, and connected at its back end to the crank J of the shaft K, in combination with the levers M M, attached to frame H, and connected at their front ends to the seed-slides F F, all arranged as and for the purpose herein set forth.

THEODR. R. BRENT.

Witnesses:
L. H. WASHONEM,
GEO. MEASON.